(12) United States Patent
Sellner et al.

(10) Patent No.: US 7,482,546 B2
(45) Date of Patent: Jan. 27, 2009

(54) CONNECTING ELEMENT FOR PRODUCING A CONNECTION BETWEEN SERVICE SWITCHING DEVICES

(75) Inventors: Rudolf Sellner, Hockenheim (DE); Matthias Bitz, St. Leon-Rot (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/660,856

(22) PCT Filed: Aug. 23, 2005

(86) PCT No.: PCT/EP2005/009090
§ 371 (c)(1),
(2), (4) Date: Feb. 22, 2007

(87) PCT Pub. No.: WO2006/024429
PCT Pub. Date: Mar. 9, 2006

(65) Prior Publication Data
US 2007/0251808 A1    Nov. 1, 2007

(30) Foreign Application Priority Data
Sep. 2, 2004    (DE) .................. 20 2004 013 708 U

(51) Int. Cl.
*H01H 9/20* (2006.01)
(52) U.S. Cl. .................... 200/293; 200/50.32
(58) Field of Classification Search .......... 439/570, 439/533, 529, 59, 60, 492, 61, 675, 578, 439/825, 607, 629, 347, 511, 723, 724, 810; 24/297, 453, 581.11; 200/50.32–50.4, 400, 200/401, 293, 295, 297, 303, 307; 218/155, 218/2–6, 22; 361/634, 637, 645; 335/202; 403/294, 292, 278, 279
See application file for complete search history.

(56) References Cited

U.S. PATENT DOCUMENTS

| 4,068,346 | A | * | 1/1978 | Binder .................. 16/110.1 |
| 4,435,031 | A | * | 3/1984 | Black et al. ............. 439/82 |
| 4,676,579 | A | * | 6/1987 | Ting .................... 439/825 |

(Continued)

FOREIGN PATENT DOCUMENTS

DE    79 00 929    1/1979

(Continued)

*Primary Examiner*—Michael A Friedhofer
(74) *Attorney, Agent, or Firm*—Buchanan Ingersoll & Rooney PC

(57) ABSTRACT

The invention relates to a connector element for two installation breakers, adjacently attached with the broad faces thereof in contact, the housings of which are each formed from two dished housing pieces. The connector element comprises an approximately cylindrical base body with a first external diameter, on the front side of which two radially-sprung, axially projecting first and second expanding arms are moulded. The external contours of the spreader arms lie on a cylindrical outer surface, the external diameter of which is smaller than the first external diameter of the base body. The free ends thereof comprise radially projecting lugs on opposed external lines, which, in the assembled state clip behind recesses on the housings, for connection by means of the connector element, of adjacent installation breakers. A spacer piece is mounted on at least one first or second expanding arm, such that the height of the spacer piece determines the minimum separation, to which the first and second expanding arms can be pressed together.

17 Claims, 4 Drawing Sheets

U.S. PATENT DOCUMENTS

Figure 1:
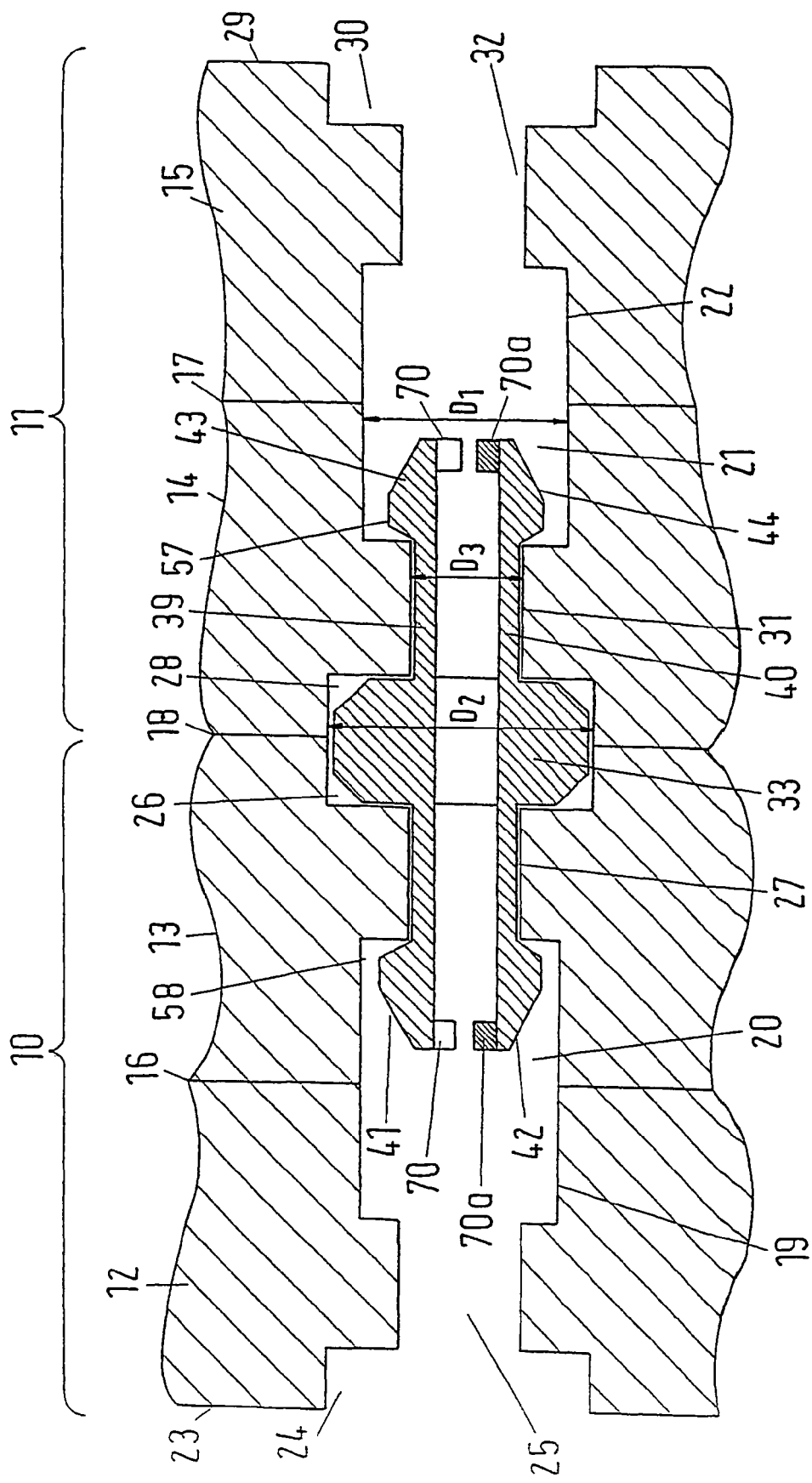

| | | | | |
|---|---|---|---|---|
| 4,954,798 | A * | 9/1990 | Kasahara et al. | 335/161 |
| 6,146,166 | A * | 11/2000 | Muzslay | 439/176 |
| 6,246,022 | B1 * | 6/2001 | Faber et al. | 200/307 |
| 6,485,329 | B2 * | 11/2002 | Eppe et al. | 439/570 |
| 6,497,579 | B1 * | 12/2002 | Garbini | 439/63 |
| 6,692,181 | B1 * | 2/2004 | Franz et al. | 403/294 |
| 6,827,608 | B2 * | 12/2004 | Hall et al. | 439/578 |
| 6,888,077 | B2 * | 5/2005 | Garcia et al. | 200/50.32 |
| 7,294,798 | B2 * | 11/2007 | Binka | 200/50.32 |

FOREIGN PATENT DOCUMENTS

| | | |
|---|---|---|
| EP | 1 109 277 A2 | 6/2001 |

\* cited by examiner

CONNECTING ELEMENT FOR PRODUCING A CONNECTION BETWEEN SERVICE SWITCHING DEVICES

The invention relates to a connecting element for connecting two service switching devices in accordance with the precharacterizing clause of claim 1 and to a connection between service switching devices in accordance with the precharacterizing clause of claim 14.

A single-pole electrical line circuit breaker or residual-current circuit breaker has a housing in the form of a shell, the front edges of the shell walls being laid against one another. The two shells are fixed in relation to one another, for example, by means of riveted joints. Such single-pole service switching devices can be assembled to form multipole service switching devices. It is known to rivet the individual poles to one another. Riveted joints are technically complex, however.

EP 1 109 277 A2 describes, as an alternative to the riveted joint, the connection of two service switching devices by means of a connecting element which has an approximately cylindrical basic body having a first outer diameter, in each case two axially protruding first and second spreading arms which spring open radially being integrally formed on the front sides of said basic body. The outer contours of the spreading arms rest on a cylindrical outer surface, whose outer diameter is smaller than the first outer diameter of the basic body. The free ends of the spreading arms have radially protruding tabs, to be precise on opposite surface lines. In the fitted state, the tabs latch in behind recesses on the housings, which are to be connected to the connecting element, of the adjacent service switching devices.

It is the object of the invention to provide a connecting element of the generic type, which can be used to markedly simplify the connection process of two service switching devices which are to be connected to one another and make it possible to produce the connection in a more reliable manner.

The object of the invention is furthermore to provide a simple and reliable connection between two service switching devices.

The object is achieved according to the invention by a connecting element having the characterizing features of claim 1. As regards a connection according to the invention, the object is achieved by the characterizing features of claim 14.

According to the invention, in each case one distancing piece is therefore fitted at least to a first or second spreading arm such that the height of the distancing piece determines the minimum distance to which the first and second spreading arms can be pushed towards one another.

In one particularly advantageous refinement, in each case one first and second distancing piece is fitted to in each case one first and second spreading arm. The first and second distancing pieces can advantageously be laterally offset with respect to one another and have the same height, with the result that, when the first and second spreading arms are pushed together, the two distancing pieces slide past one another. In particular, the first and second distancing pieces can have a trapezoidal cross-sectional contour and can be arranged in mirror-image fashion with respect to one another.

In accordance with another very advantageous refinement of the invention, the distancing pieces may consist of the same material as the spreading arms. This material can advantageously be plastic. The connecting element can then be produced, for example, together with the distancing pieces in an injection-molding process. This provides a very cost-effective manufacturing option for the connecting elements.

The advantage of a connecting element according to the invention consists in the fact that a large breadth of variation for the rigidity of the spreading arms is permissible. In the case of the spreading connection in accordance with EP 1 109 277 A2, it is necessary that the spreading arms have a certain, relatively high degree of rigidity. This restricts the options for the selection of the material and the options in terms of design.

The distancing pieces fitted according to the invention prevent it from being possible for the free ends of the spreading arms to be pushed too far towards one another in the case of relatively nonrigid spreading arms. Furthermore, the distancing pieces prevent the spreading arms from being bent to such an extent that they break off at the fixing point to the cylindrical basic body owing to material fatigue. The reliability and workability of the spreading connection are therefore overall increased and its costs decreased.

Also advantageous is a possible refinement of the connecting element, in the case of which the spreading arms, in the fitted state, can be pushed towards one another at their free end using a special tool. This is because in this case, in order to detach the connection, it is possible for the spreading arms to be pushed together using the special tool through the opening into which the connecting element has been latched, from that side of the service switching device which is opposite the connecting element, with the result that the radially protruding tabs of the connecting element unlatch from the recesses and the connecting element can be withdrawn in a simple manner from the through-hole.

In order to compensate for tolerances in the housings, the transition face between the basic body and the spreading arms and the transition face between the spreading arms and the tabs are each conical. This means that the recess bears against the tabs even in the case of an unfavorable tolerance position.

Further advantageous refinements and improvements of the invention are described in the further dependent claims.

Figure 2:
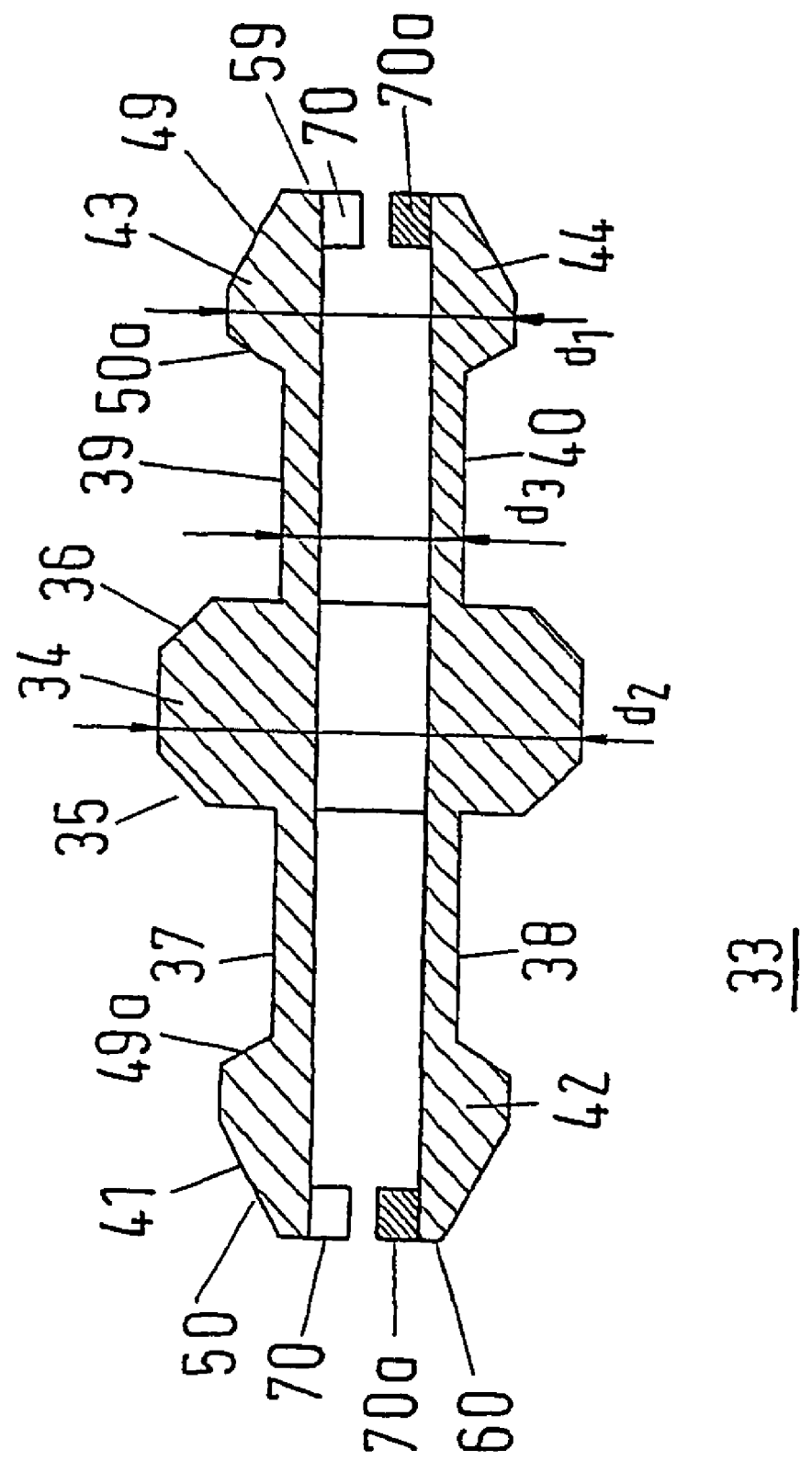
Figure 3:
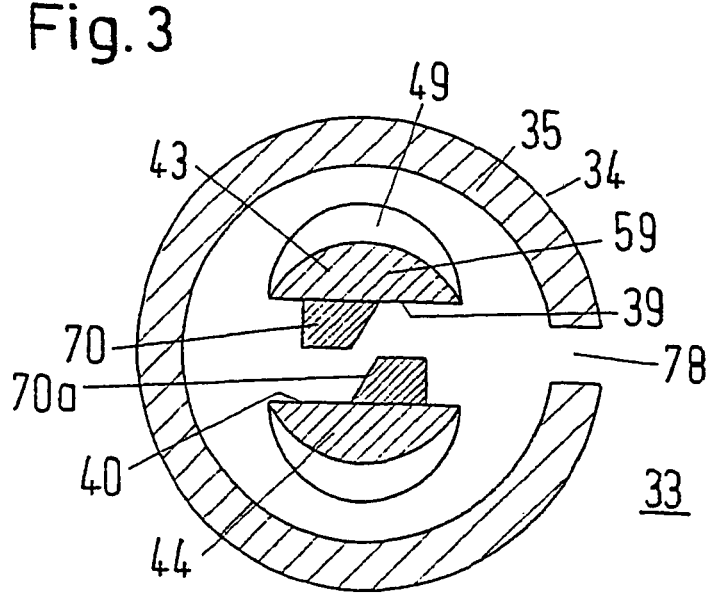
Figure 4:
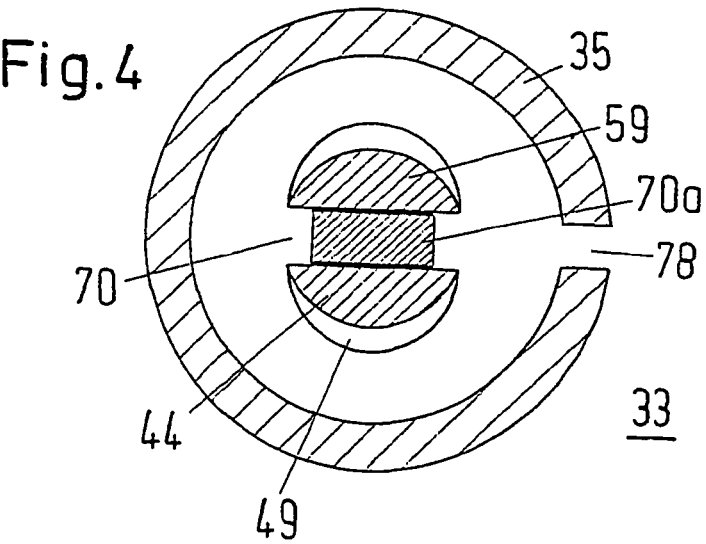
Figure 5:
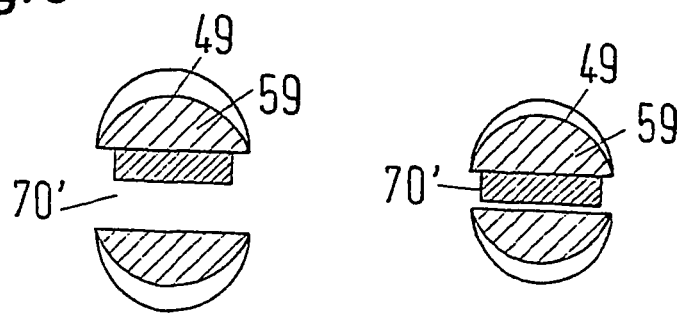
Figure 6:
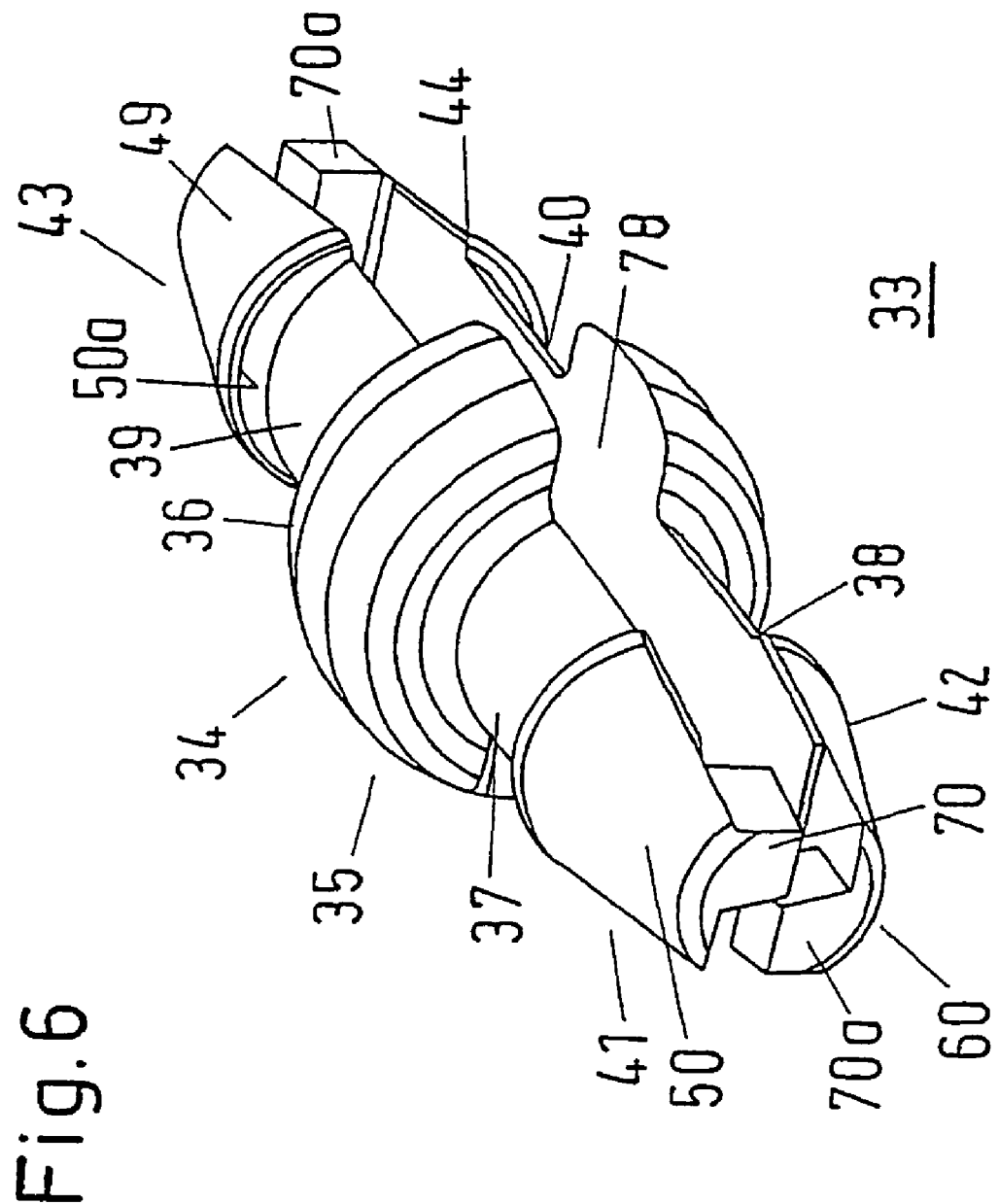

The invention and further advantageous refinements and improvements of the invention will be explained and described in more detail with reference to the drawings, in which three exemplary embodiments of the invention are illustrated and in which:

FIG. 1 shows a partially sectional view of two service switching devices having a connecting element, only that region which is adjacent to the connecting element being illustrated, FIG. 2 shows a longitudinal sectional view through the connecting element according to the invention, FIG. 3 shows a plan view of the free end of the spreading arms of the connecting element shown in FIG. 2, in the unstressed state, FIG. 4 shows a plan view of the free end of the spreading arms of the connecting element shown in FIG. 2, in the state in which they are pushed together to a maximum extent, FIG. 5 shows a plan view of the free end of the spreading arms of a further embodiment of a spreading element according to the invention, on the left-hand side in the unstressed state and on the right-hand side in the pushed-together state, and FIG. 6 shows an isometric illustration of a connecting element according to the invention.

FIG. 1 shows a sectional view of that region of two adjacent service switching device housings 10 and 11 which is adjacent to the connecting point. Each housing 10, 11 comprises shell-shaped housing parts 12, 13 and 14, 15, the partition line between the housing parts 12 and 13 having the reference numeral 16, and the partition line between the housing parts 14 and 15 having the reference numeral 17. The touching face between the two housings 10, 11 is denoted by 18 and corresponds to in each case one broad side of the two housings 10, 11.

Starting from the partition lines 16, 17, each housing part has a cylindrical first depression 19, 20 or 21, 22, which, in the assembled state when the two housing parts 12, 13 and 14, 15 are placed one on the other, form a cylindrical interior with one another. A depression 24, which is connected to the depression 19 via a through-hole 25, is located on the broad side 23 of the housing part 12. In a similar manner, the broad side of the housing part 13, which forms the touching face 18, has a depression 26, which opens out into this face and is connected to the depression 20 via a through-hole 27.

A depression 30, which is connected to the depression 22 via a through-hole 32, is located on the broad side 29 of the housing part 15. In a similar manner, the broad side of the housing part 14, which likewise forms the touching face 18, has a depression 28, which opens out into this face and is connected to the depression 21 via a through-hole 31.

The depressions 19, 20, 21 and 22, 24 and 30 are aligned with one another in the same way as the through-holes 25, 27, 31, 32.

A connecting element 33, which is illustrated in section in FIG. 2, is inserted into the depressions or through-holes.

The inner diameter of the through-holes 25, 27, 31, 32 is denoted by D3. The inner diameter of the first depressions 21, 22, 19, 20 is denoted by D1. The inner diameter of the second depressions 28, 26, 24, 30 is denoted by D2.

The connecting element 33 has a central cylindrical basic body 34, on whose front sides 35 and 36 sprung spreading arms 37, 38 and 39, 40, which protrude in the axial direction, are fitted in pairs.

The outer parts of the front sides 35 and 36 of the basic body 34 form a conical shape, whose open sides are directed towards one another. The cone angle is in this case slightly less than 180°. It is a very obtuse cone angle.

The outer diameter of the basic body 34 is denoted by d2. It is selected such that it fits into the depressions 26, 28, 30, 24. The cylinder faces surrounding the spreading arms 37, 38 and 39, 40 have an outer diameter d3, which corresponds to the inner diameter of the through-holes 25, 27, 31, 32. In each case tabs 41, 42, 43, 44 are integrally formed on the spreading arms 37, 38 and 39, 40, respectively, said tabs protruding radially in the opposite direction and resting on diametrically opposite surface lines or surface faces.

The tabs 41, 42, 43, 44 have outer tab faces 49, 50, which form a conical shape or the shape of a truncated cone, the truncated cones tapering towards the free ends 59, 60 of the spreading arms 37, 38, 39, 40.

The tabs 41, 42, 43, 44 likewise have a conical shape on their inner tab faces 49a, 50a, which lie opposite the front faces 35, 36, said conical shape being open towards the free end and likewise having a similar opening angle to the front faces 35 and 36.

The cone faces 35, 36, 49a, 50a, 49, 50 serve the purpose of compensating for tolerances in the longitudinal extent of the holes 25, 27, 31, 32 and tolerances in the diameters and of making it easier to insert the connecting elements into the openings in automated fashion.

A first and a second distancing piece 70, 70a are fitted to the free ends 59 of the two spreading arms 39, 40 between them and such that they point towards one another. The first distancing piece 70 is fitted to the spreading arm 39, and the second distancing piece 70a is fitted to the spreading arm 40. The two distancing pieces 70, 70a each have a trapezoidal cross-sectional contour and are arranged in mirror-image fashion with respect to one another.

The two distancing pieces 70, 70a consist of the same material as the spreading arms 39, 40, a plastic, and are produced together with the spreading arms in an injection-molding process.

FIG. 6 shows an isometric illustration of a connecting element 33 according to the invention, as is illustrated in FIG. 2 in longitudinal section. Identical elements or parts as have already been described in FIG. 1 or 2 have the same reference numerals. The connecting body 33 has an axially running slot 78. As a result, the basic body 34 can also be pushed together radially in a sprung manner when the connecting element 33 is inserted into the corresponding depressions, which further increases the ability of the connecting element 33 to have its contours matched.

FIG. 3 shows a plan view of the free ends 59, 60 of the connecting element 33, in the unstressed state. Identical components or parts are already described in FIG. 1, 2 or 6 and have the same reference numerals in FIG. 3. The face surrounding the tab face 49 of the radially protruding tabs 43 and 44 has an oval cross section.

FIG. 4 shows the connecting element 33 having the spreading element 70 shown in FIG. 3, but, in FIG. 4, the free ends of the spreading arms 39 and 40 are pushed together. This pushed-together position shown in FIG. 4 corresponds to the position in which the connecting element 33 is passed through the through-hole 31 in the housing half 14 of the service device 11 (see FIG. 1). In the pushed-together state in FIG. 4, the face surrounding the protruding tabs 43, 44 rests on an outer surface having a circular cross section, with the result that the protruding tabs 43, 44 can therefore easily be passed through the through-hole 31, which likewise has a circular cross section.

The distancing pieces 70, 70a slide past one another when the spreading arms 39, 40 are pushed together. The two spreading arms can only be pushed together to an extent permitted by the height of the distancing pieces. Depending on the dimensions, the adjacent angled faces of the distancing pieces 70, 70a slide towards one another.

As can be seen in FIG. 1, once the protruding tabs 43, 44 have been passed through the through-hole 31 and the inner tab face 50a, also referred to as the latching face, has been latched in behind the recess 57, the spreading arms 39 and 40 bear flat against the inner contour of the through-hole 31. The outer diameter of the cylinder face surrounding the spreading arms 39, 40 is approximately equal to the inner diameter of the through-hole 31.

For fitting purposes, the two housing parts 14 and 15 and 12 and 13 are therefore initially assembled to form in each case one service device 11 or 10. Then, the connecting element with the spreading arms 39, 40 is inserted through the through-hole 31. As soon as the spreading arms have passed through the through-hole 31, they engage with the latching face 50a behind the recess 57 adjacent to the through-opening.

In order to fix the other service device 10, it is plugged with the through-hole 27 over the tabs 41, 42 until the tabs 41, 42 engage with their latching face 49a behind the recess 58 of the through-hole 27.

FIG. 1 merely illustrates a connecting element. In order to connect two adjacent service devices, for example two line circuit breakers to form a two-pole line circuit breaker, more than one, typically three or four, connecting elements would then be necessary.

A three-pole line circuit breaker could also be produced from the two-pole line circuit breaker having the two poles 10, 11. For this purpose, a further connecting element 33a (not illustrated here, but having the same design as the connecting element 33; identical parts are denoted by the same reference numerals, supplemented by the letter a) with the spreading arms 37a, 38a is passed through the opening 32 until the tabs 41a, 42a latch into the depression 22. Then, a further switching device is latched via the latching arms 39a, 40a.

If the connection of the two switching devices 11 and 10 by means of connecting elements as shown in FIG. 1 is intended to be detached again, this can take place as follows. A special tool is inserted through the opening 32 and therefore the two free ends of the spreading arms 39, 40 of the connecting element 33 are pushed together until the protruding tabs 43, 44 unlatch from the recess 57 again. The connecting element can therefore slide out through the through-hole 31.

FIG. 5 shows a schematic illustration of a further possible embodiment for a distancing piece 70'. FIG. 5 shows a plan view of the free ends of the spreading arms of a connecting element according to the invention, the shown component parts having the same reference numerals as in the preceding figures, supplemented by an apostrophe. In this case, only one distancing piece 70' is fitted to one of the two mutually opposing spreading arms. The left-hand part of the picture in FIG. 5 shows the unstressed state, and the right-hand part of FIG. 5 shows the pushed-together state.

Other forms for the specific design and arrangement of one or more distancing pieces for realizing a connecting element according to the invention are of course also conceivable. These should all be included in the invention. It may also be necessary for design reasons not to fit the distancing piece(s) to the free end of the spreading arms but at another point. The essential concept of the present invention would therefore also be realized with such distancing pieces fitted at another point between the two spreading arms.

The invention claimed is

1. A connecting element for two service switching devices, which are arranged next to one another in a row and bear against one another with broad sides of said service switching devices, housings of each of said service switching devices are formed from two shell-like housing parts, the connecting element having an approximately cylindrical basic body having a first outer diameter and front sides, on each of said front sides two axially protruding first and second spreading arms which spring open radially are integrally formed, an outer diameter of said spreading arms is smaller than the first outer diameter of the basic body, and free ends of said spreading arms have radially protruding tabs on opposite surface lines, said tabs, in a fitted state, latch in behind recesses on the housings, which are to be connected to the connecting element, of the adjacent service switching devices, wherein one distancing piece is fitted at least to a first or second spreading arm such that a height of the distancing piece determines a minimum distance to which the first and second spreading arms can be pushed towards one another, wherein the free ends of the tabs are conically tapered.

2. The connecting element as claimed in claim 1, wherein one first and second distancing piece is fitted to one first and second spreading arm.

3. The connecting element as claimed in claim 2, wherein the first and second distancing pieces are laterally offset with respect to one another and have a same height, with a result that, when the first and second spreading arms are pressed together, the two distancing pieces slide past one another.

4. The connecting element as claimed in claim 3, wherein the first and second distancing pieces have a trapezoidal cross-sectional contour and are arranged in mirror-image fashion with respect to one another.

5. The connecting element as claimed in claim 1, wherein the distancing pieces consist of a same material as the spreading arms.

6. A connecting element as claimed in claim 1 which is manufactured using an injection-molding technique.

7. The connecting element as claimed in claim 6, wherein the connecting element is manufactured together with the spreading element in an injection-molding process.

8. A connecting element as claimed in claim 1 which is manufactured from plastic.

9. The connecting element as claimed in claim 1, wherein the spreading arms, in a fitted state, can be pushed towards one another at a free end using a special tool.

10. The connecting element as claimed in claim 1, wherein the front faces of the basic body are in a form of a truncated cone, cone angles being open towards one another.

11. The connecting element as claimed in claim 10, wherein a cone base diameter is larger than an outer diameter of a cylindrical outer surface and smaller than a first outer diameter of the cylindrical basic body.

12. The connecting element as claimed in claim 1, wherein tab faces opposite the front faces have a conical shape and a cone angle open in an opposite direction.

13. A connection for service switching devices, housings of each of said service switching devices are formed from two shell-like housing parts, having a connecting element as claimed in claim 1, each housing, starting from a partition line between the two housings, having a cylindrical, first depression having a first inner diameter, which corresponds to a cone base diameter of the connecting element, and, starting from a housing broad side, having a cylindrical, second depression having a second inner diameter, which corresponds to an outer diameter of a cylindrical basic body, said first and second depressions are connected to one another by a cylindrical through-hole, wherein the connecting element engages with tab faces behind recesses, which are produced at a transition between the first cylindrical depressions in the housing parts to be connected of the service switching devices and the cylindrical through-holes.

14. The connection as claimed in claim 13, wherein outer contours of radially protruding tabs of the connecting element, in an uninstalled state, rest on an outer surface having oval cross sections and, during fitting, rest on an outer surface having circular cross sections.

15. The connecting element as claimed in claim 1, wherein said service switching devices comprise line circuit breakers or residual-current circuit breakers.

16. A connecting element for two service switching devices, which are arranged next to one another in a row and bear against one another with broad sides of said service switching devices, housings of each of said service switching devices are formed from two shell-like housing parts, the connecting element having an approximately cylindrical basic body having a first outer diameter and front sides, on each of said front sides two axially protruding first and second spreading arms which spring open radially are integrally formed, an outer diameter of said spreading arms is smaller than the first outer diameter of the basic body, and free ends of said spreading arms have radially protruding tabs on opposite surface lines, said tabs, in a fitted state, latch in behind recesses on the housings, which are to be connected to the connecting element, of the adjacent service switching devices, wherein one distancing piece is fitted at least to a first or second spreading arm such that a height of the distancing piece determines a minimum distance to which the first and second spreading arms can be pushed towards one another, wherein the first and second distancing pieces are laterally offset with respect to one another and have a same height, with a result that, when the first and second spreading arms are pressed together, the two distancing pieces slide past one another.

17. A connection for service switching devices, housings of each of said service switching devices are formed from two shell-like housing parts, having a connecting element having an approximately cylindrical basic body having a first outer diameter and front sides, on each of said front sides two axially protruding first and second spreading arms which spring open radially are integrally formed, an outer diameter of said spreading arms is smaller than the first outer diameter of the basic body, and free ends of said spreading arms have radially protruding tabs on opposite surface lines, said tabs, in a fitted state, latch in behind recesses on the housings, which are to be connected to the connecting element, of the adjacent service switching devices, wherein one distancing piece is fitted at least to a first or second spreading arm such that a height of the distancing piece determines a minimum distance to which the first and second spreading arms can be pushed towards one another, each housing, starting from a partition line between the two housings, having a cylindrical, first depression having a first inner diameter, which corresponds to a cone base diameter of the connecting element, and, starting from a housing broad side, having a cylindrical, second depression having a second inner diameter, which corresponds to an outer diameter of a cylindrical basic body, said first and second depressions are connected to one another by a cylindrical through-hole, wherein the connecting element engages with tab faces behind recesses, which are produced at a transition between the first cylindrical depressions in the housing parts to be connected of the service switching devices and the cylindrical through-holes, wherein outer contours of radially protruding tabs of the connecting element, in an uninstalled state, rest on an outer surface having oval cross sections and, during fitting, rest on an outer surface having circular cross sections.

* * * * *